(12) United States Patent
Meade et al.

(10) Patent No.: US 6,401,383 B1
(45) Date of Patent: Jun. 11, 2002

(54) ELECTRONIC APPARATUS TO ATTRACT AND KILL FLIES IN INDOOR AND OUTDOOR ENVIRONMENTS

(76) Inventors: David P. Meade, 89 Howell Rd., Freehold, NJ (US) 07728; Robert H. Richardson, 208 Sylvan Dr., Hayesville, NC (US) 28904

( * ) Notice: Subject to any disclaimer, the term of this patent is extended or adjusted under 35 U.S.C. 154(b) by 0 days.

(21) Appl. No.: 09/741,487

(22) Filed: Dec. 18, 2000

(51) Int. Cl.[7] .................................................. A01M 1/22
(52) U.S. Cl. ...................................................... 43/112
(58) Field of Search ................................ 43/98, 112

(56) References Cited

U.S. PATENT DOCUMENTS

| | | | | |
|---|---|---|---|---|
| 1,058,680 A | * | 4/1913 | Warren | 43/112 |
| 2,270,684 A | * | 1/1942 | Kopisch | 43/112 |
| 2,404,687 A | * | 7/1946 | Bowser | 43/112 |
| 2,897,629 A | * | 8/1959 | Jesman | 43/112 |
| 2,912,787 A | * | 11/1959 | Partridge | 43/112 |
| 2,917,863 A | * | 12/1959 | Anderson et al. | 43/112 |
| 4,839,984 A | * | 6/1989 | Saunders et al. | 43/112 |
| 5,031,353 A | * | 7/1991 | Gardiner | 43/98 |
| 5,325,624 A | | 7/1994 | Richardson | 43/112 |
| 5,347,748 A | * | 9/1994 | Moreland et al. | 43/112 |
| 5,369,909 A | | 12/1994 | Murphy | 43/112 |
| 5,570,537 A | * | 11/1996 | Black et al. | 43/112 |
| 5,979,107 A | * | 11/1999 | Richardson et al. | 43/112 |

* cited by examiner

*Primary Examiner*—Darren W. Ark

(57) ABSTRACT

An improved non-toxic, non-chemical, non-polluting, inexpensive electronic apparatus to control the population of many species of flies both indoors and outdoors around poultry and animal enclosures and food processing facilities which attracts and then kills the flies with a short burst of high voltage oscillations that is applied to an exposure pair of closely spaced parallel conductors or an exposed grid network of closely spaced parallel conductors.

5 Claims, 8 Drawing Sheets

Figure 1:
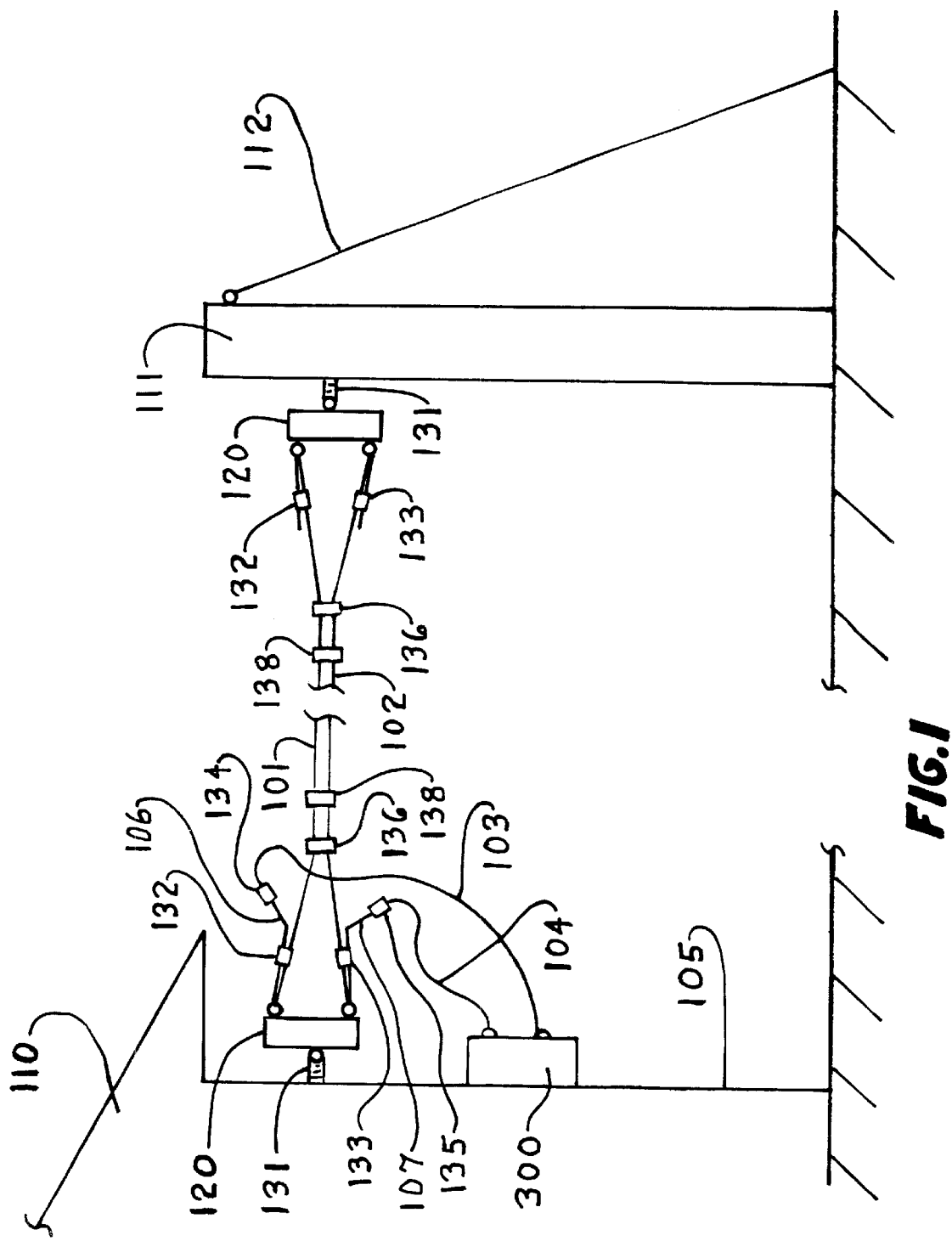

ELECTRONIC APPARATUS TO ATTRACT AND KILL FLIES IN INDOOR AND OUTDOOR ENVIRONMENTS

TECHNICAL FIELD

This invention relates to an improved apparatus to attract and kill flies, specifically to a non-toxic, non-chemical electronic means for reducing the fly population in and around commercial facilities such as dairies, feed lots, poultry houses, and processing plants by applying a brief burst of high voltage oscillations to a set of or a grid of exposed parallel conductors. The flies are attracted to these exposed conductors by either of two types of attractants; one appeals to the flies natural instincts to roost and another appeals to the flies natural instincts to breed and lay their eggs. The flies that contact the exposed conductors are killed and fall to the ground under the apparatus.

BACKGROUND—DESCRIPTION OF PRIOR ART

U.S. Pat. No. 5,325,624 issued to Richardson et al on Jul. 5, 1994 discloses a non-toxic, non-chemical, non-polluting electronic apparatus to control the fly population within an animal or poultry enclosure which does not kill by electrocution or incineration but rather by destroying the nervous system of the fly with a short burst of high voltage oscillations that is applied to a set of parallel conductors. U.S. Pat. No. 5,979,107 issued to Richardson et al on Nov. 9, 1999 disclosed an improved means for obtaining and installing the parallel conductors that is also not limited to straight runs but can be installed in any pattern as long as the proper spacing between the conductors is maintained. Both of the above apparatus relied on the natural instincts of some species of flies to roost and are limited to permanent indoor applications.

Experience resulting from the widespread use of the above inventions has shown the need for an apparatus that will attract and kill blow flies, carrion flies, face flies, and other biting and pest flies as well as the common house flies. These other flies and biting insects are not attracted to a roosting site as are the common house flies and they generally populate outdoor areas rather than indoor facilities.

The electronic devices generally used as a means of eliminating insects near homes and gardens using blacklight or fluorescent lights as an attractant and a constant high voltage alternating current on the grid to kill the insects have been tried and proven to be totally ineffective for these applications. The insects that are of a concern to the commercial farmer and food processor are common house flies, blow flies, carrion flies, face flies, and other biting and pest flies. These flies are not attracted by the fluorescent or black lights used in the units that are intended primarily for mosquitoes and moths.

Devices called "fly traps" use carrion or rotting mash as an attractant are available for commercial use. Their general configuration is one where the fly is attracted through a funnel trap arrangement into a bucket to collect the flies. The bucket must be cleaned out periodically and therefore maintenance of the units is high and in heavy fly infestations these units are easily overwhelmed.

U.S. Pat. No. 5,369,909 issued to Murphy on Dec. 6, 1994 places a set of parallel conductors on an electric fence and uses the high voltage pulse from an electronic fence charger and a ground rod as the electrical return path. The experience gained from many tests has proven this to not be an effective fly killing device. The high voltage pulse from a fence charger does not contain sufficient energy to kill any quantify of flies and the ground return is not reliable as a low resistance conductor. A typical electronic fence charger produces very narrow pulses (1–2 usec) with an amplitude of 6–10 KV peak and a pulse repetition rate of about one pulse per second. The output energy content of these fence controllers is determined by the size of the capacitor in which the energy is stored and the voltage across the capacitor. The relationship is expressed mathematically as $E=\frac{1}{2} C(V \times V)$ where E=energy in joules. A typical electronic fence charger will have a potential pulsed energy output of 0.5 to 10 joules. A standard electronic fence charger with the highest output energy will not kill most flies on a conducting wire grid as defined herein. It tends to have the same effect on flies as it does on a cow or a horse: that is, the shock repels the animal and trains it to stay away from the area.

Another problem found in the attempts to use a standard electronic fence charger to supply the killing voltage to the grid network was the pulse repetition rate of about 1 per second does not allow sufficient time for the fly to land on the grid network or surrounding surfaces and approach the conducting grid. The repetition rate must be one every 2 to 4 seconds. Two seconds allows time for the flies to land and 4 seconds does not allow sufficient time for them to get to the holes to the attractant.

Extensive testing has found that a pulse width of 20 milliseconds or greater is required to supply sufficient energy to kill flies. As the pulse width is decreased below 20 milliseconds fewer and fewer flies will be killed and more just repelled. Greater than 80 milliseconds contains sufficient energy to cause ignition of some materials A typical electronic fence charger outputs a pulse of approximately 1 microsecond. To increase the pulse width from 1 microsecond to the required 20 milliseconds would require an unreasonably large capacitor. This capacitor would have to be in excess of 200,000 microfarads with an operating voltage capability of at least 600 VDC and would have to store over 10 to the 13th power (obviously impossible) joules.

The invention disclosed herein supplies a voltage burst to the grid network that is 8000 volts peak-to-peak with a duration of 60 milliseconds and a burst repetition rate of one burst every 2 ½ seconds. This is a burst of 8000 V peak-to-peak oscillations and not an 8000 Volt peak pulse of energy as is outputted by electric fence charges. The burst provides the maximum killing energy to effectively kill the flies but remains narrow enough and infrequent enough to be safe considering fire hazards as well as safety to humans and animals.

The use of a high impedance output transformer limits the output current and thus gives added safety to humans and animals but provides sufficient power to kill flies that get across the parallel conductors of the grid.

OBJECT AND ADVANTAGES

It is recognized by all concerned with the production of livestock or poultry and operators of dairies and food processing plants that control of the fly population is necessary to maintain animal health, keep the premises sanitary, and reduce complaints from workers and neighbors. The animals in these locations attract a great many flies that can lead to health related problems for the animals as well as complaints from surrounding residents. Dairies often move the livestock to different pastures at varying periods which means that the fly control apparatus must necessarily be moved from time to time to remain in proximity to the livestock and to maintain its effectiveness to control the fly population. Food processing plants have similar fly control problems and the chemicals available for control at these locations is very limited, expensive, and the use of them is continuously under attack by environmental and governmental groups. Whereas, the concepts disclosed in U.S. Pat. Nos. 5,325,624 and 5,979,107 provides only an attractive roosting site and kills the flies that land on the roosting means, the basic objective of this invention is to provide the most efficient attractant for the given environment and nature of the pests and provide an improved electronic means to kill the attracted flies and control their population whether indoors or outdoors.

The referenced patents use extremely long runs of highly conductive parallel wires as a roosting means (up to several thousand feet) hung throughout the livestock enclosure. The roosting means must be moisture resistant but need not be weather proof as they are always installed inside the livestock enclosure. An object of this invention is to disclose an improved passive roosting means, hereafter referred to as the "Twin Cable Assembly", that can also be used outdoors, and a new relocatable killing grid, hereafter referred to as the "Fly Tower", that contains an active attractant that represents a perfect breeding/layering means to attract all species of flies and kill the flies with a controlled burst of high voltage oscillations from an improved electronic control unit thus killing more flies and a broader range of fly species.

Another objective of this invention is to provide a simple non-toxic, non-chemical, effective, inexpensive fly population control apparatus that requires very little maintenance and can be effectively and safely used indoors or outdoors in all weather conditions.

Another objective is to provide a fly control apparatus that can be easily and quickly moved from one location to another to "follow the herd" and thus be easily relocated to the problem areas.

Another objective is to provide an apparatus wherein several of the attracting and killing means can be operated from one electronic device.

Another device is to provide a means of attracting the flies that not only attracts and kills the common house fly but also will attract and kill blow flies, carrion flies, face flies, and other biting and pest flies.

Another objective is to provide an improved electronic means to safely produce the necessary controlled burst of high voltage oscillations required to kill large quantities of flies and sufficiently control the fly population in the desired areas whether indoors or outdoors.

Another objective of this invention is to reduce the labor necessary to install the fly killing system and also to reduce maintenance costs associated with previously disclosed systems.

Another objective of this invention is to disclose an inexpensive, effective electronic control unit that can be powered from a standard 12 volt battery for use in remote locations where 115 VAC power is not available.

Further objectives and advantages of this invention will become apparent from a consideration of the drawings and ensuing description.

DRAWING FIGURES

FIG. 1 shows a typical outdoor installation of the improved killing cables (Twin Cable Assembly)

Figure 2:
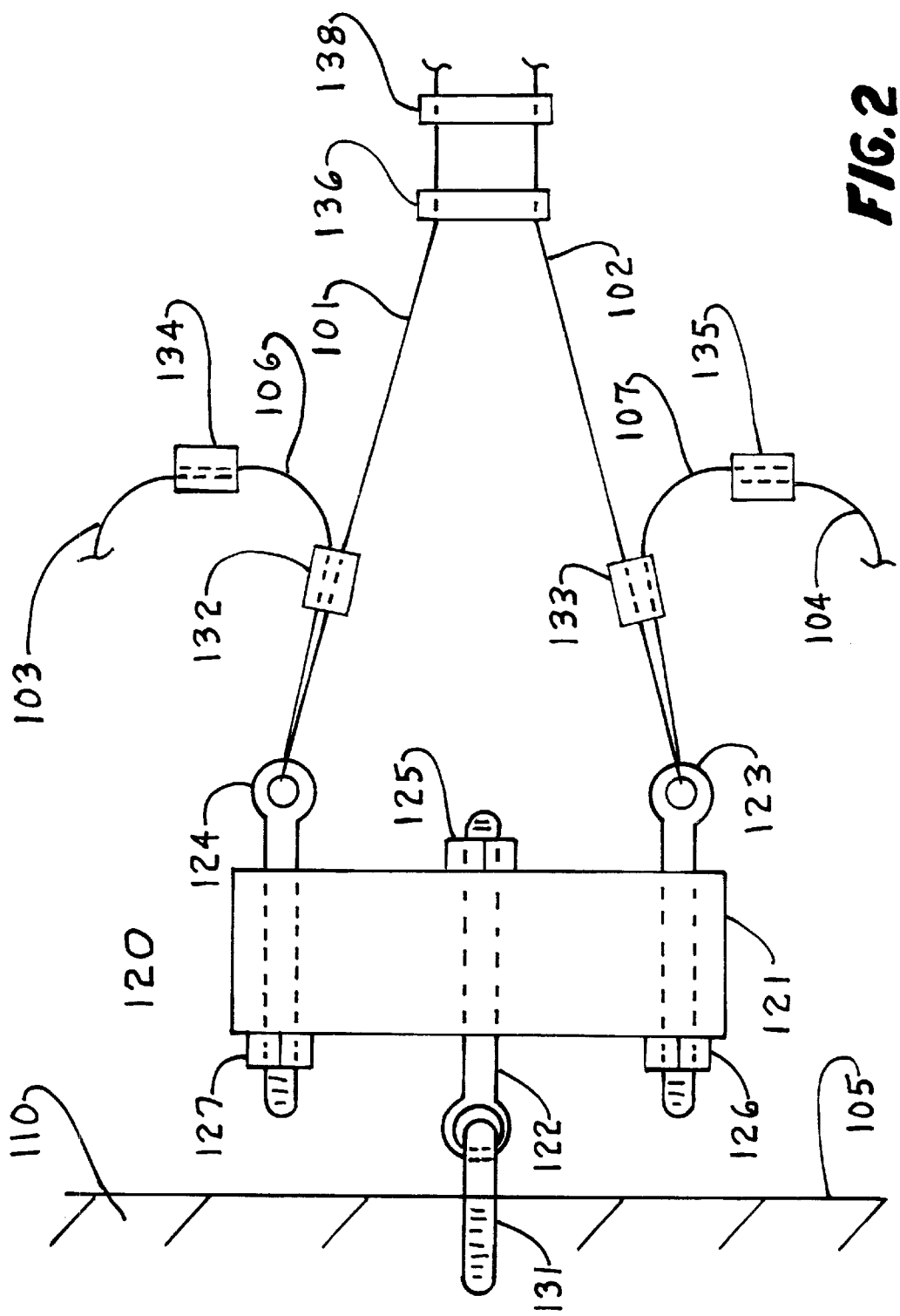
Figure 3:
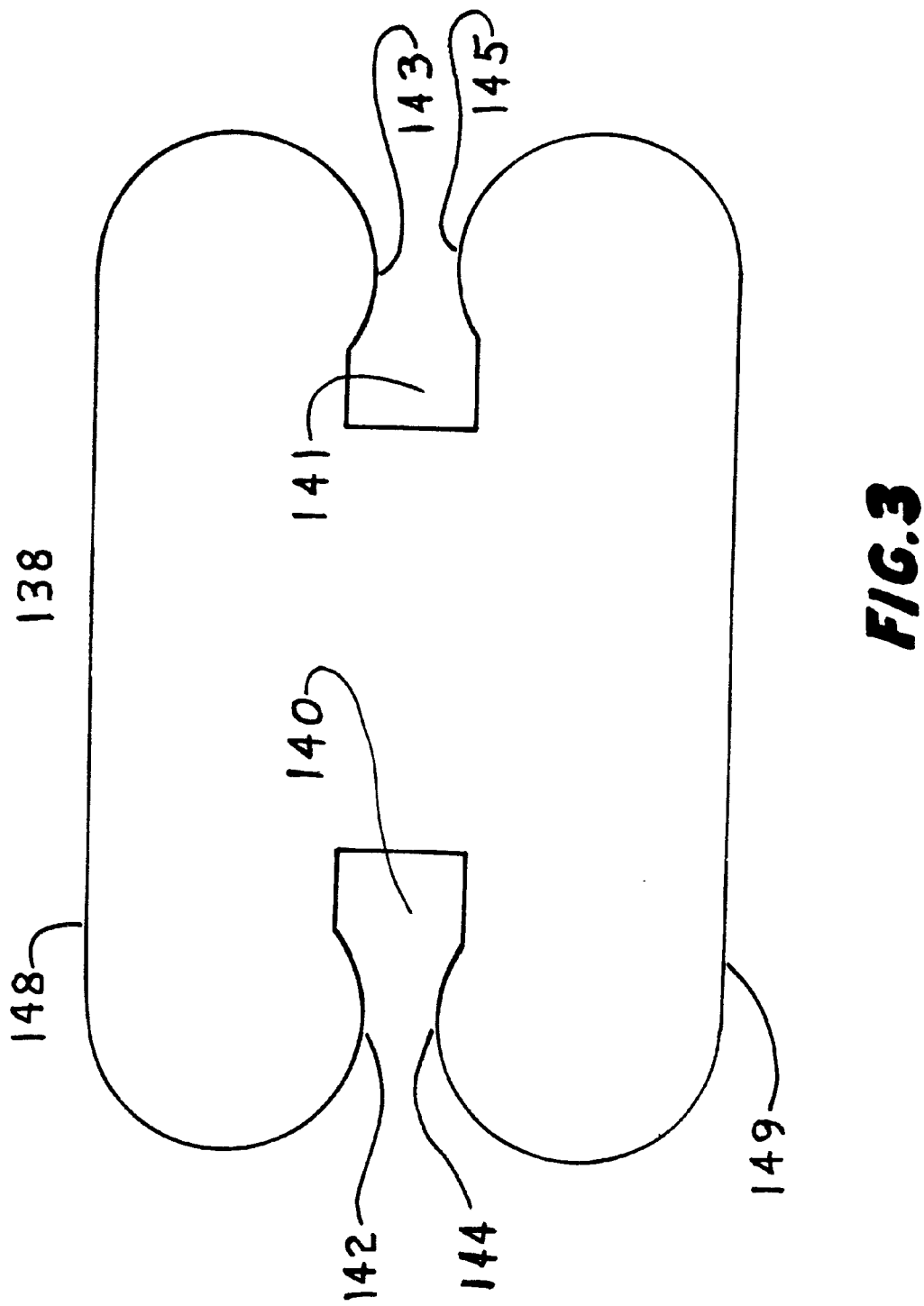
Figure 4:
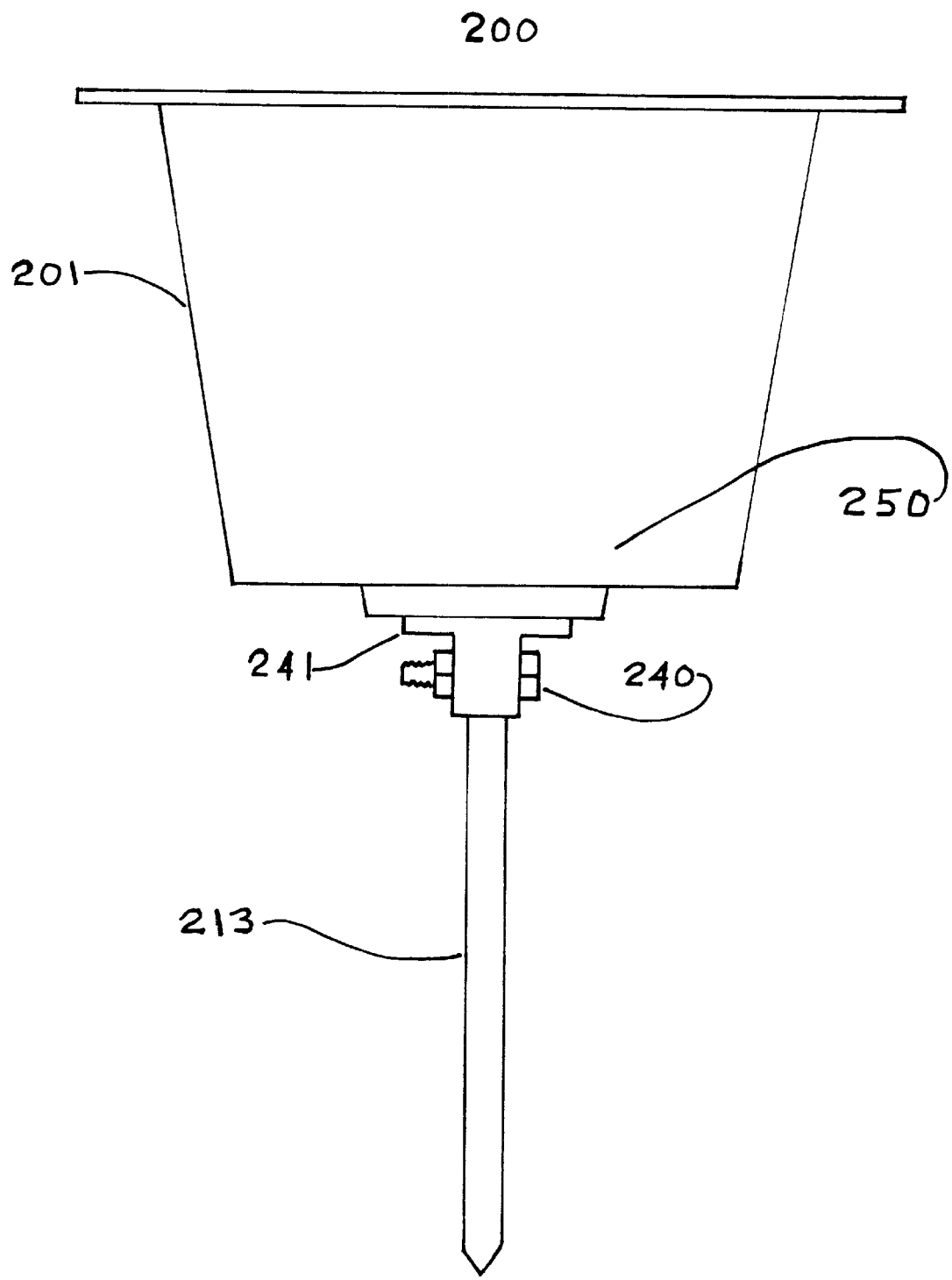
Figure 5:
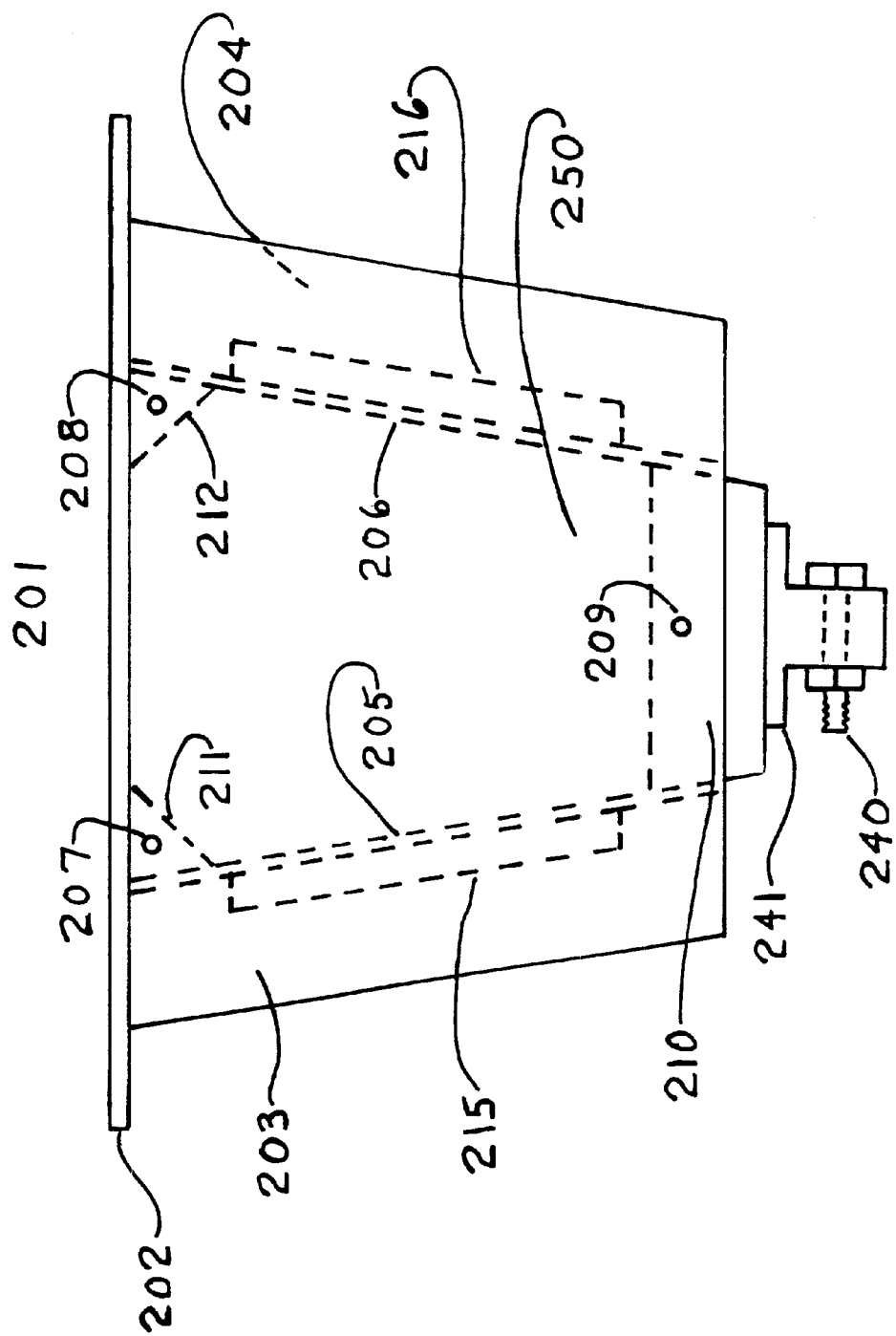
Figure 6:
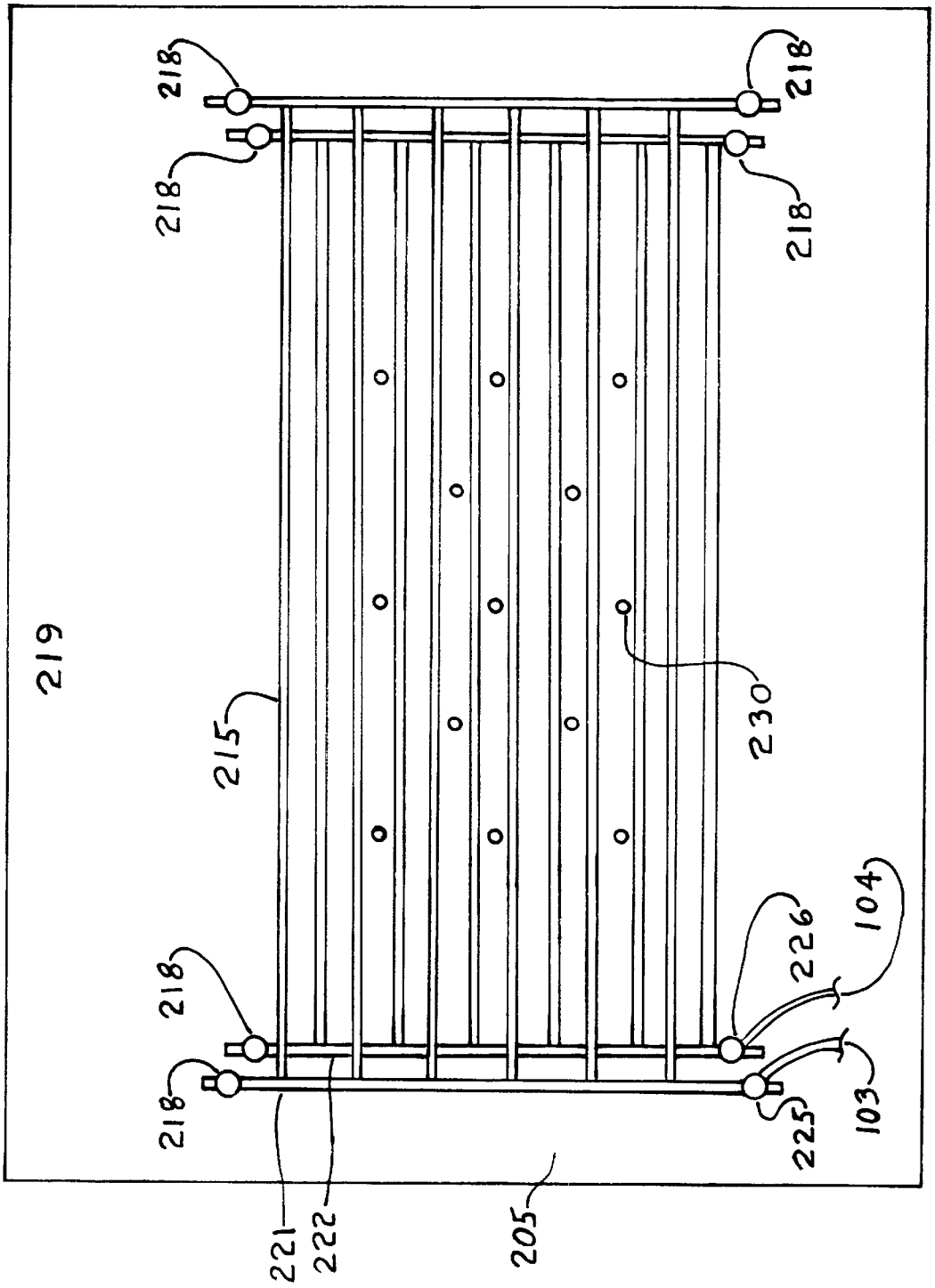
Figure 7:
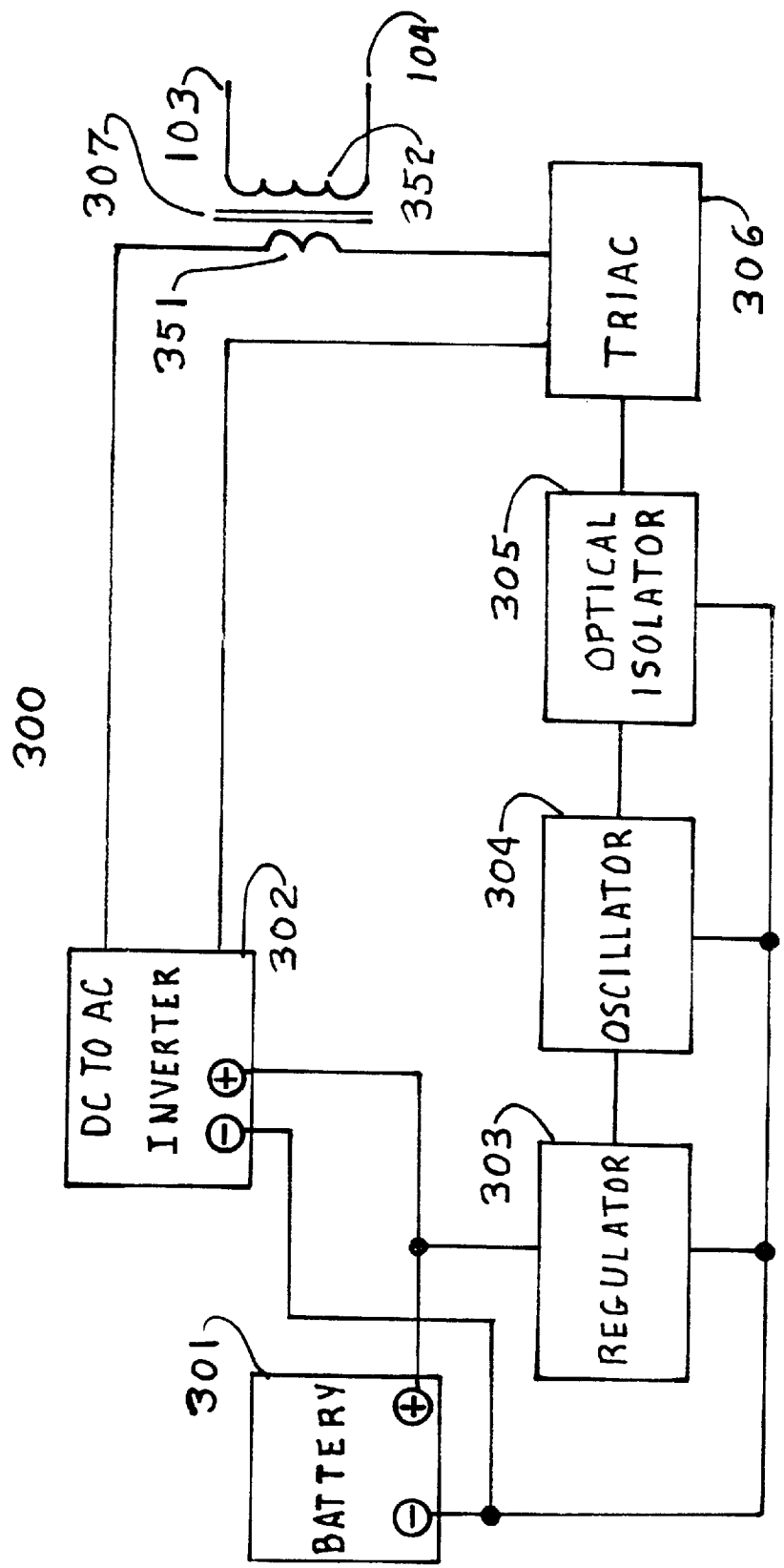
Figure 8:
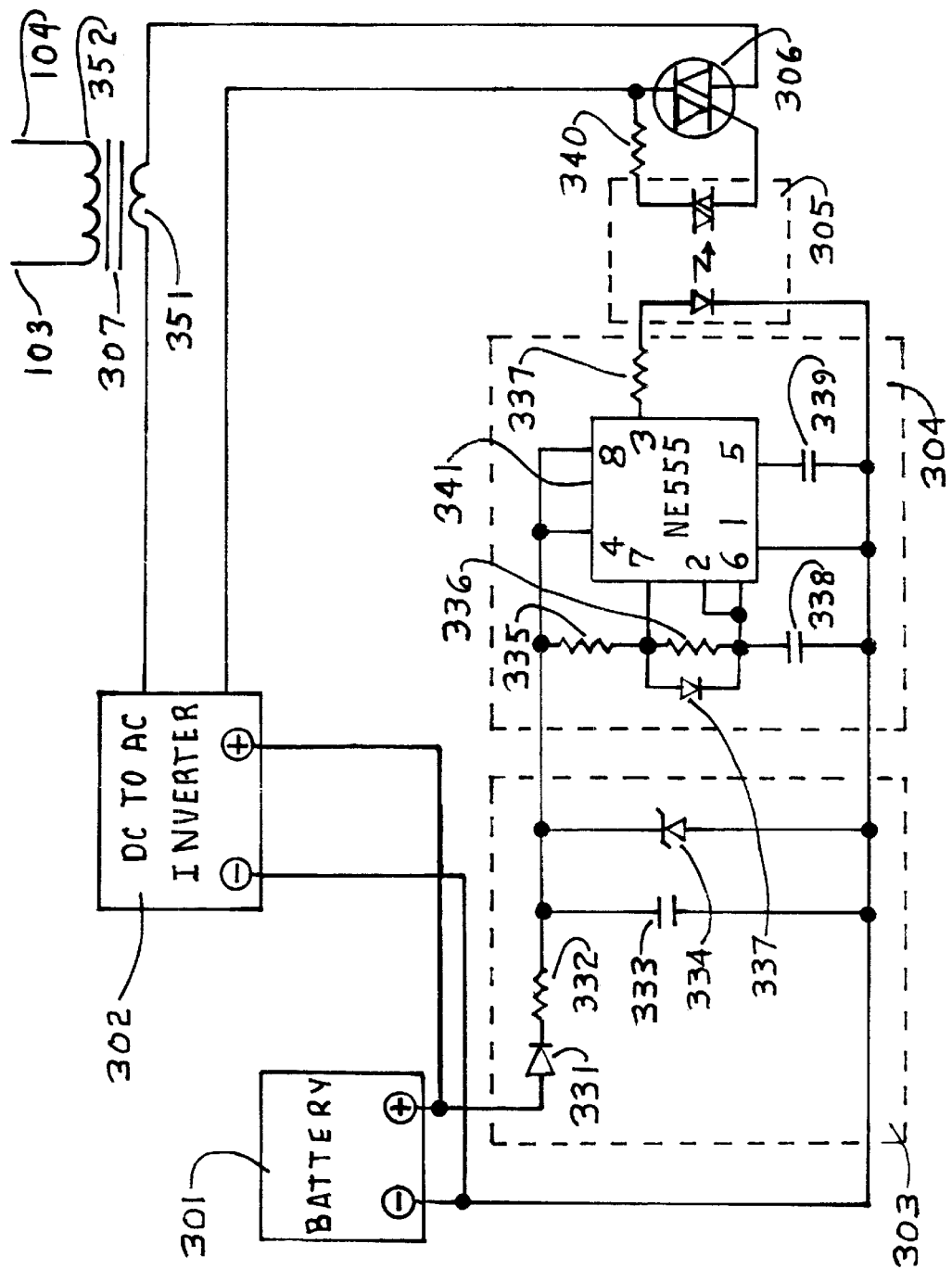

FIG. 2 is a detail diagram of the conductor mounting configuration in an indoor or outdoor installation FIG. 3 is an enlarged detail description of the retainer/spacers used in an installation FIG. 4 shows a typical Fly Tower installation FIG. 5 is a detail drawing of the Fly Tower enclosure FIG. 6 is a detail drawing of the killing grid used in the Fly Tower FIG. 7 is a block diagram illustrating the first embodiment of the electronic control unit of this invention FIG. 8 is a schematic diagram of the electronic control unit

DESCRIPTION OF THE PREFERRED EMBODIMENT

The Fly Pop'R system as described in U.S. Pat. Nos. 5,325,624 and 5,979,107 was designed to operate with long conductors runs (up to 2500 feet) of killing cables or cord installed inside animal or poultry buildings. The killing cables or cord provides a roosting site and therefore will attract large quantities of flies that are inside the building. However, there are also flies present outside of these buildings as well as in and around feet lots, dairies, slaughter houses, food processing plants, etc. If a roosting site is provided in these areas, large quantities of flies will be attracted to it. This invention improves on the Fly Pop'R system as disclosed in U.S. Pat. Nos. 5,325,624 and 5,979, 107 so as to provide an attractive roosting means for the flies in outdoor as well as indoor environments.

FIG. 1 shows the Twin Cable Assembly parallel conductors 101 and 102 attached between a building 110 and a remote post 111 that is properly supported by guy wire 112. It is obvious that the parallel killing cables 101 and 102 could also be installed between two buildings or between two posts. An area can be easily and efficiently covered with a spoke-like arrangement around a central mounting post.

To survive and properly function in the severe outdoor environment, several improvements to the previous patents were required. FIG. 2 shows the details of the presently preferred outdoor installation configuration for attracting and killing flies that have the roosting instincts.

The parallel killing conductors 101 and 102 must be changed to 1/16", #316 stainless steel, 1×19 strand with a #8 jewelers finish and with a breaking strength of 480 pounds. This is a marine grade stainless steel cable that is highly corrosion resistant and is polished to resist dirt and dust. This high polished finish is also very attractive to flies that instinctively rise to roost. These are tough, durable cables that can be cleaned with a wire brush or a pressure washer.

The killing cables 101 and 102 are securely held in place by an adjustable end assembly 120 as shown in FIG. 2.

The isolation plate 121 is made from 1/4" thick, 2" diameter fiberglass tubing that is cut in half to form the half-round isolation plate 121. The isolation plate serves to electrically isolate the conductors.

Eyebolts 122, 123 and 124, are 4"×1/4", 18-8 stainless steel which serve to connect the conductors to the isolation plate 121 and provide an adjustment to equalize the tension in the conductors. Hex nuts 125, 126 and 127, are also stainless steel to withstand the harsh outdoor environments. A stainless steel screw hook 131 is used to secure the adjustable end assembly 120 to a rigid structure such as building 110 or post 111. The screw hook 131 is stainless steel 5"×5/16".

Stainless steel capable clamps 132 and 133 require no special tools to install as do the cable crimps used in the previous disclosure.

Another advantage of using the cable clamps 132 and 133 is that these do not give a permanent connection as does the cable crimps, but can be loosened to take up slack if necessary during installation or during any required maintenance procedures.

As can be readily seen, all hardware used for the adjustable end assembly 120 is stainless steel and is therefore corrosion resistant and tough enough to withstand the outdoor environments and strong enough to support and maintain the tension necessary to hold the killing cables 101 and 102 parallel over long distances.

Cable retention spacers 138, reference FIG. 3, are made from UV resistant polypropylene which is also weather and chemical resistant and will not carbon path under a high voltage arc. These cable retention spacers 138 are placed approximately every 10 feet along the killing cables 101 and 102 to hold them parallel to each other and to hold them at the proper spacing of 3/16".

The cable retention spacers 138 are designed such that the 1/16" killing cables 101 and 102 will snap into the retainer areas 140 and 141 which are each 0.062" wide. The killing cables are held into place by the force of protrusions 142 and 144 and 143 and 145 which have an opening of 0.042" at their closest points. The main body of the cable retention spacer 138 is 0.312" from surface 148 to surface 149 and the thickness is 0.125".

A nylon cable tie 136 is used to draw the killing cables 101 and 102 close enough together to be securely held by the cable retention spacers 138. The nylon cable tie 136 is black, weatherproof, UV resistant, 7 ½" long with a strength of 50 pounds.

Wire nuts 134 and 135 are standard electrical type for 22 to 14 AWG wire sizes. These are used to attach the high voltage wires 103 and 104 to the tag ends 106 and 107 of the killing cables 101 and 102.

High voltage wires 103 and 104 connect the killing burst from the electronic control unit 300 to the killing cables 101 and 102. These high voltage wires 103 and 104 are weatherproof, #18 AWG, multistrand, with a 10,000 volt plastic insulation.

The same configuration of adjustable end assembly is used at each end of the installation as shown in FIG. 1.

The improvements to U.S. Pat. Nos. 5,325,624 and 5,979,107 disclosed herein provide a non-toxic, non-chemical, inexpensive apparatus for killing roosting flies both indoors and outdoors. However, there are other species of pest flies that do not share the roosting instinct with house flies, face flies etc.

Many species such as carrion flies, fannia flies, horn flies, horse flies, and other pest flies, while not having roosting instincts, all share a very strong reproductive instinct. They are attached by rotting animal and vegetable matter, not only as food, but also as an egg laying site. It is therefore obvious that to control all species of flies, a way to mimic an odor that will appeal to the reproductive or feeding instinct and eliminate the fly once it was attracted is a desirable goal. The present preferred embodiment of the attracting and killing apparatus is disclosed herein. This apparatus will be referred to as the Fly Tower 200 and can be used as an extension to the improved Fly Pop'R system or as an independent system. After reviewing the following disclosures, it will be readily apparent that the Fly Tower 200, as an extension to the improved Fly Pop'R system, provides a non-toxic, non-chemical, inexpensive system for controlling the population of all species of flies both indoors and outdoors.

The present preferred embodiment for the Fly Tower 200 is shown in FIG. 4 and FIG. 5. It consists of a weatherproof enclosure 201 that houses a bait chamber 250 and a pair of killing grids 215 and 216. This enclosure 201 is mounted about 4 feet above ground level on a mounting rod 203 that is driven into the ground for stability. The mounting rod 213 is metal such as a 1" galvanized pipe to prevent small amounts that might be attracted by the odor from the bait chamber 250 from climbing to the enclosure 201. The enclose 201 is easily removed from the mounting rod 213 by removing a retaining bolt 240 that securely fastens a mounting bracket 241 to the mounting rod 213.

The present preferred embodiment for the Fly Tower 200 enclosure 201 is shown in FIG. 5. The enclosure 201 consists of a top 202, ends 203 and 204, and black plates 205 and 206 that hold the killing grids 215 and 216, all made of ¼" white polyethylene. The top 202 extends beyond the sides to add to the weatherproof aspects of the enclosure 201. The two end panels 203 and 204 are removable with stainless steel screws 207, 208, 209 to allow access to the bait chamber 250. Two back plates 205 and 206 support the killing grids 215 and 216 and have strategic holes 230 to allow the bait attractant odor to escape the enclosure 201 as shown in FIG. 6.

A block of wolmanized lumber 210 is used as a base plate and it makes up the floor of the enclosure 201. This gives a solid foundation on which to attach the mounting bracket 241, the ends 203 and 204 and provides a location for the bait chamber 250 to sit.

Two upper frame supports 211 and 212 are attached to the top 202 and provide support for the killing grids 215 and 216. These are also made from wolmanized lumber to resist the weather.

The details of a killing grid assembly 219 is shown in FIG. 6. The killing grid assembly 219 consists of a back plate 205 or 206 on which is mounted two groups of ⅛" stainless steel rods spaced 9/32" apart. Each group 221 and 222 is held securely to the back plate 205 by three polypropylene threaded studs 218 and a threaded brass stud 225 and 226. Back plates 205 and 206 are identical.

The back plate 205 is constructed of ¼" white polyethylene and has several strategically located holes 230 drilled in it to allow the odor from the attractant in the bait chamber 250 to escape the enclosure 201.

The two groups of rods 221 and 222 are electrically isolated from each other as each group 221 and 222 will be at different electrical potential during operation. The groups of rods 221 at 222 are maintained at a separation of 9/32" at all points.

The distance between the face of the back plate 205 and the bottom edge of the rods 221 and 222 that make up the killing grid 215 is maintained at ½". This spacing is sufficient to allow the dead flies to drop out to the ground but not enough space for the flies to get to the odor holes 230 without contacting the killing grid 215.

The threaded brass studs 225 and 226 are attached to the high voltage wires 103 and 104 on the backside of the back plates 205 and 206.

Another embodiment is a single group 221 or 222 of rods mounted on but electrically isolated from a back plate 205 or 206 that is made from a conducting material such as stainless steel. The grid 221 or 222 and the conducting back plate 205 or 206 are connected to the high voltage wires 103 and 104. This configuration is not as efficient as the preferred embodiment in that the dead flies can more easily become lodged between the grid 221 or 222 and the conducting back plate thus requiring more maintenance.

The present preferred attractant consist of one quart 50/50 mixture of cornmeal and meat scrap meal. Both of these meals are dry powders that make them light and easy to handle and ship. Neither of these meals has a strong or objectionable odor in the dry state. To activate them, they are placed in a plastic container and mixed with enough water to make a slurry. The container is then placed in the bait chamber 250 of the Fly Tower 200 enclosure 201. Within a short time the odor will be very attractive to all species of flies, but noticeable to humans only when they are close to the Fly Tower 200 installation. Once mixed with water and allowed to react, even if the mixture dries out, the odor will remain strong enough to attract flies.

The Fly Tower 200 is weatherproof, easy to install and use, and needs no cleaning. Once purchased it will require only minimal expenses for electricity and a yearly replacement of the attractant. Several Fly Towers 200 can be operated from one control unit 300 and the Fly Towers 200 may be moved at any time to accommodate rotational grazing, or changing fly problems. They can share an electronic control unit 200 with an outdoor or indoor installation of killing cables 101 and 102 as previously defined.

The Fly Tower 200 attachment is strong enough to lure files away from cattle, poultry, and other livestock, and bring them to the self cleaning, electronic killing grid from long distances.

The Fly Tower 200 is very different and much safer than an electric fence. It is safer because the rods 221 and 222 of the killing grids 215 and 216 of the Fly Tower 200 are only 9/32" apart. Anyone touching the grid will only have the electricity pass through a fingertip for 9/32". It will not pass through the whole body to reference ground like an electric fence.

The Fly Tower 200 electronic control unit is very different from fence charger electronics. Even the most modern, powerful fence chargers will not kill a fly. If a fence charge is used in place of the Fly Tower 200 power unit, the capacitor discharge of the fence charger does not generate enough energy to damage the fly's nervous system. There is only a snap and the fly flies away. The Fly Tower's 200 longer duration oscillatory power burst is needed to kill flies.

If 115 VAC power is available, an electronic control unit as disclosed in U.S. Pat. No. 5,325,624 is usable if modified to meet the requirements for operating the Fly Tower 200 as disclosed herein. The modifications are to increase the burst time from 20 milliseconds to 60 milliseconds and the burst repetition rate from one every 2 seconds to one every 2 ½ seconds. The high voltage oscillations must remain at 8000 V peak-to-peak.

However, because of the potentially remote locations for mounting the Fly Tower 200 and the improved outdoor killing cables 101 and 102, the need for a battery powered electronic control unit is obvious.

FIG. 7 is a block diagram illustrating a first embodiment of an improved electronic control unit 300 and FIG. 8 is a schematic of the preferred embodiment for this unit. This unit uses a commercially available DC to AC invertor 302 to produce the 115 VAC necessary to drive a high voltage transformer 307. This power inverter 302 is available from Waga Tech is Item #39393. It produces 115 VAC @ 60 HZ and an output power of 400 watts peak with a 10–15 VDC input as shown from a 12 volt battery 301.

A 12 VDC regulator 303 consists of a blocking diode 331 and limiting resistor 332 that limit the direction and amount of current into a filter capacitor 333, zener diode 334, and oscillator 304. A regulator 303 limits the voltage to the oscillator 304 to a maximum of 12 VDC.

Oscillator 304 generates the timing to turn on a triac 306 as required to produce the high voltage burst from transformer 307.

Optical isolator 305 isolates the low voltage DC circuitry from the triac 306 which operates at 115 VAC.

Oscillator 304 is of standard NE555 design 341 and produces an oscillating square wave output with an on time (high at pin 3) of 60 milliseconds and an OFF time (low at pin 3) of 2 ½ seconds.

Resistors 335 and 336 along with diode 337 and capacitor 338 are selected to produce this desired output. Typical value are resistor 335=51K, resistor 336=2.4 meg., and capacitor 338=2.2 uf.

Optical isolator 305 is a standard device such as a Motorola MOC 3010 that has a triac driver output. Resistor 337 (typically=680 ohms) limits the current to the input of the optical isolator 305. Resistor 340 (typically=1K) limits the current through the optical isolator 305 output and thus the gate current to the triac 306. Triac 306 is a standard commercial device such as a Motorola 2N6239.

A primary 351 of high voltage transformer 307 is supplied current from the output of the DC to AC Inverter 302 and is switched on and off by the action of a triac 306 (under control of an oscillator 304) which is in series with the primary 351. When current is flowing from the 115 VAC output of the DC to AC inverter 302 to the primary 351 of the high voltage transformer 307, the high impedance secondary 352 of this transformer 307 is producing an 8000V peak-to-peak, 60 Hz oscillation. This high voltage is present for 60 milliseconds and occurs every 2 ½ seconds. This is the voltage that is present across the killing cables 101 and 102 and the Fly Tower 200 grid networks 215 and 216 that kills the flies that are present.

A pair of high voltage wires 103 and 104 with an insulation sufficient to withstand these high voltages is used to connect the electronic control unit 300 with the killing cables 101 and 102 and the Fly Tower grid networks 205 and 216.

OPERATION

FIG. 1 and FIG. 2 show a typical outdoor installation of the Twin Cable Assembly parallel killing cables 101 and 102.

Installation consists of mounting the screw hooks 131 at each end of the desired area to be covered such as between a building 110 and a post 111. An adjustable end assembly 120 is then attached to these screw hooks 131 at each end. The killing cables 101 and 102 are then routed through the respective eyebolts 123 and 124 at one end and firmly secured with cable clamps 132 and 133. The killing cables 101 and 102 are then routed through the eyebolts 123 and 124 at the other end, drawn tight and firmly secured with cable clamps 132 and 133. Eyebolts 122, 123 and 124 are then used to align and evenly tighten the killing cables 101 and 102. A nylon tie wrap 136 is then placed about 10" from the cable clamps 132 and 133 and used to draw the two killing cables 101 and 102 closer together. Cable retention spacers 138 are then attached every 10 feed to set the proper separation of 3/16" between the killing cables 101 and 102.

High voltage wires 103 and 104 are attached to the tag ends 106 and 107 of the killing cables 101 and 102 using wire nut 134 and 135. The other ends of the high voltage wires 103 and 104 go to the secondary winding 352 of the high voltage transformer 307 which is part of the electronic control unit 300.

FIG. 4 shows a typical installation of the Fly Tower 200. A 1" galvanized pipe is driven into the ground to form the mounting rod 213. The Fly Tower 200 enclosure 201 is then attached and securely held by retaining bolt 240 and mounting bracket 241.

High voltage wires 103 and 104 are attached to the threaded brass studs 225 and 226 that are on the backside of the back plates 205 and 206. This connects the high voltage bursts of oscillations generated by the electronic control unit 300 to the killing grids 215 and 216.

The high voltage bursts of oscillations may be connected electrically in parallel via high voltage wires 103 and 104 to several Fly Tower 2000 installations. They may also be electrically connected in parallel to several runs of killing cables 101 and 102.

A 50/50 mixture of cornmeal and meat scrap meal is mixed with enough water to make a slurry. An open plastic container of this slurry is then placed in the bait chamber 250 of the Fly Tower enclosure 201. Within a short time the odor from the slurry will become very attractive to all species of flies both as food and a reproduction location.

When the electronic control unit 300 is activated, the high voltage burst of oscillations (8000V peak-to-peak, 60 Hz, for 60 milliseconds that occurs once every 2 ½ seconds) is present across the parallel conductors making up the killing cables 101 and 102 and across the killing grids 215 and 216 of the Fly Tower 200.

The combination of a passive roosting site formed by the killing cables 101 and 102 and an active attractant produced by the Fly Tower 200, will draw large quantities of flies that are then killed by the high voltage burst of oscillations produced by the electronic control unit 300.

SUMMARY OF THE INVENTION

According to this invention in one form the apparatus consists of an improved electronic control unit 300 that provides a controlled burst of high voltage oscillations to a group of long parallel conductors that provide an improved roosting means for the flies and/or to a grid of parallel conductors that are in proximity to an active attractant that appeals to the feeding and reproductive instincts of all species of flies.

Thus a device if provided for controlling fly populations while at the same time providing a device which is safe for use around humans, safe for use in nearly any environment and which is inexpensive to operate and which requires very low maintenance.

Accordingly, the reader can see that the apparatus of this invention can be used to control the population of flies both within and outside an animal or poultry shelter. In addition, the reader can see that the techniques and apparatus described in this disclosure are not only unique but also safe, effective and inexpensive and also represent a clearly marketable product.

Although the descriptions herein contain many specifications, these should not be construed as limiting the scope of the invention but merely producing illustrations of the presently preferred embodiments of this invention. It is to be understood that the invention may be modified in many ways within the scope of the appended claims. In particular, it is to be understood that the invention is not limited to the specific embodiment wire configuration killing grid configuration, electronic circuitry, pulse width and timing, or to the numerical values employed in describing this invention. Further, many other types of components and materials may be employed in practicing the invention in place of those which have been specifically described.

We claim:

1. A device for controlling the population of flies both indoors and outdoors around poultry and animal facilities with short bursts of high voltage oscillations, said device comprising:

(a) a roosting means providing a roosting surface for said flies, said roosting means having a pair of parallel conductors extendable between any two rigid surfaces, said parallel conductors held both 3/16" apart and parallel with polypropylene UV resistant molded devices placed along said parallel conductors, said conductors attachable to said rigid surfaces by an end assembly means for securing said parallel conductors, electrically isolating said parallel conductors, and providing an adjustment to both equalize the tension in said parallel conductors and establish tension in said parallel conductors, said end assembly means having: an isolation plate to electrically isolate said parallel conductors, a first adjustable means to attach said isolation plate to each of said conductors and equalize the tension in said parallel conductors, and a second adjustable means to attach said isolation plate to one of said rigid surfaces;

(b) an electronic control unit for generating said short bursts of high voltage oscillations, said high voltage oscillations being 3 ½ to 4 ½ cycles of 50/60 Hz with an amplitude of 7,500 to 8,000 volts peak-to-peak that occurs once every 3 to 4 seconds;

(c) means to electrically connect said parallel conductors to said electronic control unit; whereby when said electronic control unit is connected to said parallel conductors, 3 ½ to 4 ½ cycles of 50/60 Hz with an amplitude of 7,500–8,000 volts peak-to-peak occurs once every 3–4 seconds across said parallel conductors.

2. The device as defined in claim 1, wherein said conductors each comprise a cable being 1/16" diameter, #316 stainless steel, 1×19 strands, with a #8 jewelers finish.

3. The device as defined in claim 1 wherein said end assembly isolation plate is ¼" thick, 2" diameter fiberglass tubing cut in half lengthwise.

4. The device as defined in claim 1 wherein said first adjustable means are 4"×¼", 18×8 stainless steel eyebolts.

5. The device as defined in claim 1 wherein said means to electrically connect said parallel conductors to said electronic control unit are high voltage wires with an insulation rating of at least 10,000 volts for delivery of said short bursts of high voltage oscillations to said parallel conductors.

* * * * *